United States Patent [19]

Boulton

[11] Patent Number: 4,832,381
[45] Date of Patent: May 23, 1989

[54] SEAL

[75] Inventor: Paul D. Boulton, Bristol, United Kingdom

[73] Assignee: Cameron Iron Works USA, Inc., Houston, Tex.

[21] Appl. No.: 94,571

[22] Filed: Sep. 9, 1987

[51] Int. Cl.$^4$ .......................................... F16L 19/00
[52] U.S. Cl. .................................. 285/351; 285/338; 285/917; 277/236
[58] Field of Search ............... 285/351, 335, 348, 347, 285/338, 923, 917; 277/123, 124, 125, 236

[56] References Cited

U.S. PATENT DOCUMENTS

| | | | |
|---|---|---|---|
| 2,410,177 | 10/1946 | Marvin et al. | 277/236 |
| 4,056,272 | 11/1977 | Morrill. | |
| 4,082,105 | 4/1978 | Allen. | |
| 4,109,942 | 8/1978 | Morrill. | |
| 4,346,919 | 8/1982 | Morrill. | |
| 4,402,773 | 9/1983 | Morrill. | |
| 4,451,047 | 5/1984 | Herd et al. | 277/123 X |
| 4,455,040 | 6/1984 | Shinn. | |
| 4,458,905 | 7/1984 | Bosch | 285/917 |
| 4,613,159 | 9/1986 | Harris et al. | 285/351 X |

FOREIGN PATENT DOCUMENTS

| | | | |
|---|---|---|---|
| 763306 | 7/1967 | Canada | 277/123 |
| 2074277 | 10/1981 | United Kingdom | 285/351 |

Primary Examiner—Randolph A. Reese
Assistant Examiner—Anthony Knight

[57] ABSTRACT

A seal assembly for providing a primary metal-to-metal seal between the outer wall of a tubular member and the inner wall of a surrounding receiving bore slidingly receiving the tubular member. The sealing assembly includes a metal seal ring member having the general configuration of a toroid which has been flattened on its upper and lower surfaces. The metal seal ring member has a close fit on the outer wall of the tubular member, and an interference fit with the wall of the receiving bore. When stabbed into the receiving bore, the metal seal ring member coins onto the walls of the tubular member and the bore, resulting in an effective metal-to-metal seal. The seal assembly preferably includes a compliant seal ring member of a preferably high lubricity material, e.g., Teflon, disposed on the tubular member below the metal seal ring member. The compliant seal ring member tends to clean, and possibly lubricate, the receiving bore as the tubular member is stabbed therein and withdrawn therefrom, and to prevent damage to the bore during such operations. It also provides a low pressure environmental seal. An elastomer seal ring may be disposed on the tubular member above the metal seal ring to provide an additional environmental seal or a back-up seal.

23 Claims, 1 Drawing Sheet

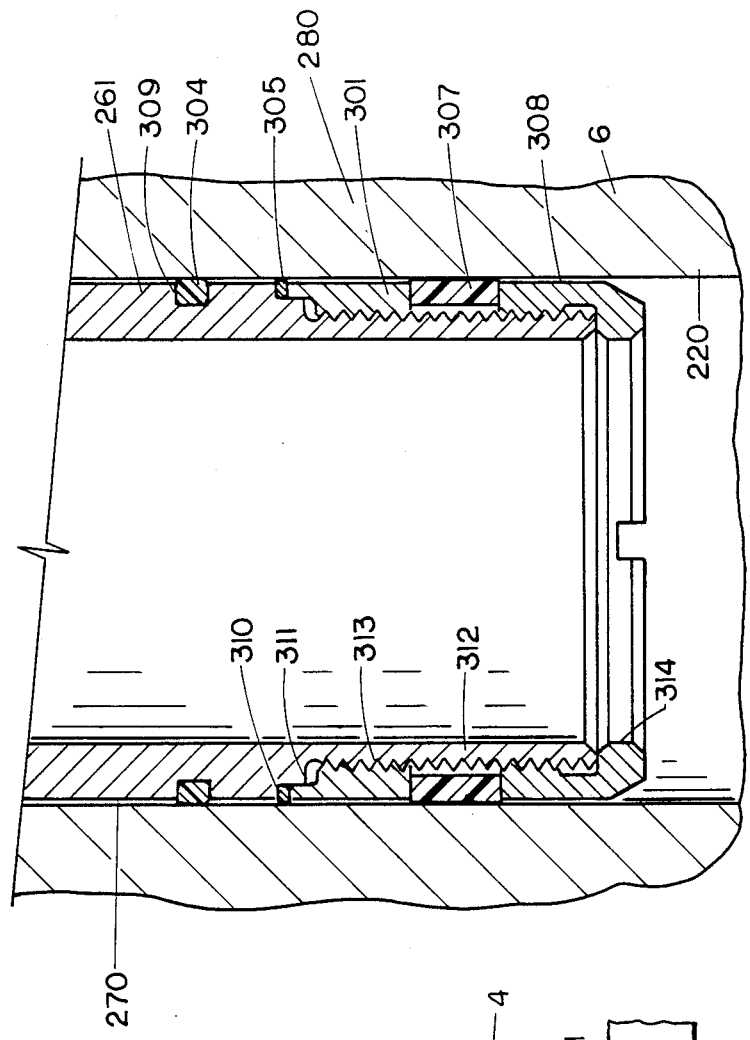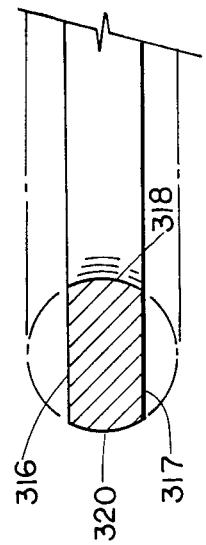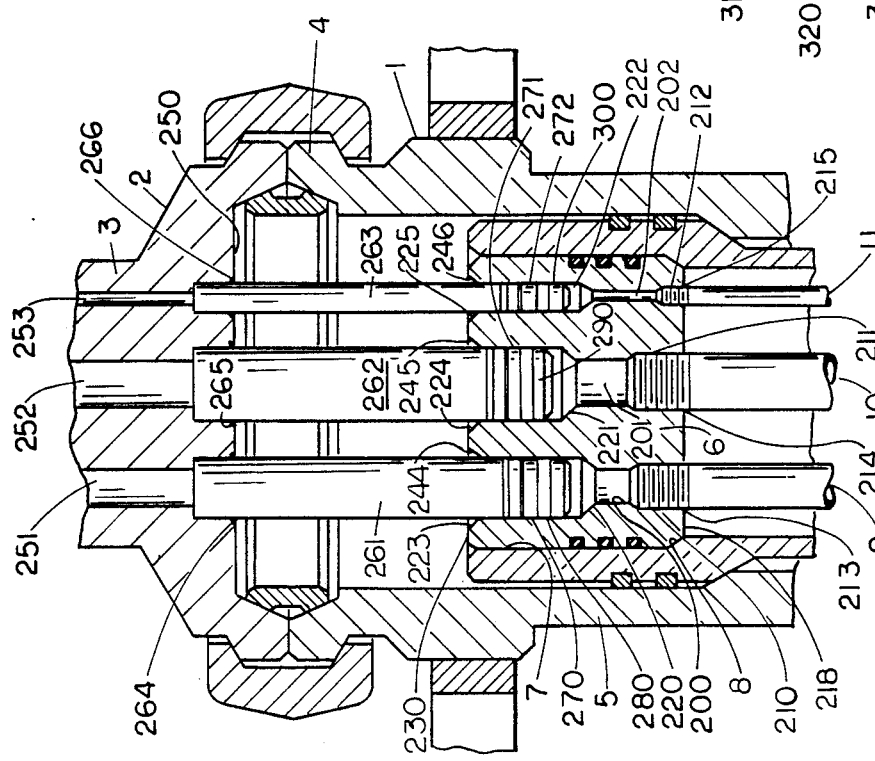

SEAL

BACKGROUND OF THE INVENTION

This invention relates generally to sealing assemblies, and more particularly to a remotely actuated stab-in sealing assembly for effecting a metal-to-metal seal between a tubular member, such as a pack-off nipple of an underwater oil or gas well, and the wall of a bore within which the tubular member is received, such as a tubing hanger bore.

Various means have heretofore been used to seal around tubular elements in a wellhead. Elastomeric rings have been used, an example being the O-rings and packing elements of elastomeric material shown in U.S. Pat. No. 2,830,665 to Burns et al. Unfortunately, elastomeric seals, such as those disclosed in Burns, have experienced difficulties in containing, by themselves, the high bottom hole pressures encountered during service. Elastomeric seals also can break down when exposed to chemicals, heat, or other adverse elements in the sometimes-harsh subsea oil and gas well environment.

Another example of a wellhead seal is disclosed in U.S. Pat. No. 2,992,840 to Reynolds et al., which is directed to a frustoconical-shaped metal gasket which is compressed between two flanges having a greater cone angle so that the gasket is deformed, the edges of the gasket being "coined" so as to closely engage elements of the flanges and provide a metal-to-metal seal. Although these and other prior art metal ring gaskets can withstand the high pressures and harsh environments encountered in underwater oil or gas well service, some problems have been experienced which result in their being unsuitable for some applications. Sometimes the metal ring gaskets have a tendency to gall the tubing hanger bore or other bore into which the gaskets are stabbed, making it difficult to obtain a light seal on the damaged surfaces and possibly incapacitating the equipment for future use without costly or time-consuming repairs. Sometimes the metal ring gaskets of the prior art cannot accommodate the uncertainty, due to the manner in which the underwater well components are assembled down hole, as to the respective axial positions of the two surfaces which are to be sealed against This low "stack-up tolerance" of some prior art metal seal rings can result in an improperly energized seal. Moreover, even when properly initially energized, sometimes problems arise with prior art metal seal rings when the sealed surfaces experience slight axial movements with respect to each other during service. Loss of sealing function or improper energization can sometimes result.

It is the object of the present invention to overcome these and other deficiencies and problems experienced with prior art metal seal rings.

SUMMARY OF THE INVENTION

According to the present invention, a deformable metal seal ring member for remote stab-in is disposed on the outer wall surface of a tubular member, in this instance a pack-off nipple, the metal seal ring member having the general configuration of a toroid which has been flattened on its upper and lower sides. The metal seal ring member has an outer diameter larger than the inner diameter of the receiving bore into which the pack-off nipple is stabbed, forming an interference fit when received within the bore. Upon stab-in, the radially outer surface of the metal seal member coins against the inner wall of the bore, and the radially inner surface of the metal seal member coins against the pack-off nipple, forming a good metal-to-metal seal.

The sealing assembly of the present invention preferably includes a compliant seal ring member of preferably high lubricity material, e.g., Teflon, the compliant seal ring member also being disposed on the outer wall surface of the pack-off nipple, below the metal seal ring member. The compliant seal ring member tends to clean and, to some degree, lubricate the areas of the receiving bore into which the metal seal ring member is stabbed, and tends to prevent damage to the receiving bore during the stab-in operation and also during removal of the pack-off nipple from the bore. The compliant seal ring member is in tight sliding engagement with the receiving bore, forming a low pressure environmental seal. An elastomer seal ring may be provided above the metal seal ring member as an additional environmental seal or back-up seal for the primary metal-to-metal seal. The metal seal ring member may be made of, e.g., AISI 4130 steel, which may also be through hardened, hard-faced, or nitrided.

The sealing assembly of the present invention is simple and economical to manufacture. It provides a tight metal-to-metal seal for the high pressures and temperatures encountered in oil and gas well service. It is relatively impervious to the corrosive or harsh chemical environment often found in subsea oil and gas wells. The primary metal-to-metal seals can be actuated effectively by the weight of, e.g., a Christmas tree on which are disposed the pack-off nipples carrying the sealing assemblies. The present invention also accommodates stack-up tolerances of, e.g., two inches or more, and maintains the metal-to-metal seal during and after smaller axial movements of the pack-off nipples within the bores which are sometimes encountered during service. These and other objects and advantages of the present invention will be apparent when considering the following description, in conjunction with the accompanying drawings.

BRIEF DESCRIPTION OF THE DRAWINGS

FIG. 1 is a vertical sectional view of a portion of a wellhead with a tubing hanger and a portion of a Christmas tree with multiple tubular members, here pack-off nipples, carrying thereon the annular metal seal ring member and associated components of the present invention;

FIG. 2 is an enlarged vertical sectional view of a tubular member or pack-off nipple of FIG. 1 carrying thereon a preferred embodiment of the seal assembly of the present invention, and disposed in a sealing bore within the tubing hanger of FIG. 1; and FIG. 3 is an enlarged fragmentary cross-sectional view of the metal seal ring member of the present invention before being compressed, e.g., on stab-in.

DESCRIPTION OF THE PREFERRED EMBODIMENT

Referring now to FIG. 1, there is shown a wellhead 1 and a lower flange 2 of a Christmas tree 3 supported on a shoulder 4 of wellhead 1. Wellhead 1 is supported by a conventional casing hanger (not shown) which also supports at least one, and usually a series of, juxtaposed inner casing hangers suspended within the bore of the wellhead. The innermost casing hanger 5 of the casing hangers supports a tubing hanger 6. See, for example, U.S. Pat. No. 4,402,773, issued Sept. 6, 1983, to Morrill. Tubing hanger 6 is supported within the bore 7 of the innermost casing hanger 5 on a shoulder 8 thereof. Tubing hanger 6 supports a set of tubing strings 9, 10 and a hydraulic line 11 as is well known in the art.

Bores 200, 201, 202 are formed in tubing hanger 6 by drilling or other means known in the art and have first threaded bores 210, 211, 212, respectively, which are coaxial with tubing strings 9, 10 and hydraulic line 11, respectively. Threaded bores 210, 211, 212 have openings at 213, 214, 215, respectively, on the lower surface 218 of tubing hanger 6. Tubing strings 9, 10 and hydraulic line 11 are attached to threaded bores 210, 211, 212, respectively. Bores 200, 201, 202 further include substantially smooth counterbores 220, 221, 222, respectively, having openings 223, 224, 225, respectively, on the upper surface 230 of tubing hanger 6. Smooth counterbores 220, 221, 222 are coaxial with threaded bores 210, 211, 212. The mouths of openings 223, 224, 225 include upwardly facing, inwardly tapered annular surfaces 244, 445, 246, respectively.

Upper surface 230 of tubing hanger 6 is opposite to and spaced apart from lower surface 250 of Christmas tree 3. Christmas tree 3 includes bore or pockets 251, 252, 253 formed therein by drilling or other suitable means. Bores 251, 252, 253 have openings in lower surface 250 of Christmas tree 3. Bores 251, 252, 253 extend upwardly through Christmas tree 3 to valves and hydraulic connections (not shown).

Pack-off nipples 261, 262, 263 are coaxial with and attached to bores 251, 252, 253, respectively, by welds 264, 265, 266 or other suitable attachment means. Pack-off nipples 261, 262, 263 depend from the lower surface 250 of Christmas tree 3.

Pack-off nipples 261, 262, 263 are telescopically received in smooth counterbores 220, 221, 222, the outer surfaces 270, 271, 272 of pack-off nipples 261, 262, 263 being substantially parallel to the inner walls of smooth counterbores 220, 221, 222 of bores 200, 201, 202. The sealing assemblies of the present invention 280, 290, 300 are located on the outer surfaces 270, 271, 272, respectively, of pack-off nipples 261, 262, 263. Sealing assemblies 280, 290, 300 form primary metal-to-metal seals with both the outer surfaces 270, 271, 272, respectively, of pack-off nipples 261, 262, 263 and the walls of smooth counterbores 220, 221, 222 of receiving bores 200, 201, 202, respectively.

Referring now to FIG. 2, pack-off nipple 261 is shown telescopically received within smooth counterbore 220 of bore 200 of tubing hanger 6. Since sealing assemblies 280, 290, 300 are alike, only one will be described in further detail. Disposed around outer wall surface 270 of pack-off nipple 261 is an annular elastomer seal member 304, an annular metal seal ring member 305 of the present invention, a tubular metal seal ring retaining collar 308, a high lubricity, annular, compliant seal ring member or wear ring 307, and a tubular and or wear ring retaining collar 308. Outer wall 270 of pack-off nipple 261 contains an annular groove 309 in which elastomer seal member 304 is disposed. Below and axially spaced apart from annular groove 309, outer surface 270 of pack-off nipple 261 is reduced in outer diameter, thus forming a first annular shoulder 310. Below shoulder 310 is disposed metal seal ring member 305, shoulder 310 preventing metal seal ring member 305 from sliding axially upwardly along pack-off nipple 261 on stab-in. Metal seal ring member 305 is held in place against shoulder 310 by tubular retaining collar 301 which is threadingly engaged on threads 313 located around the periphery of lower end portion 312 of pack-off nipple 261. The lower end portion 312 o pack-off nipple 261 is reduced in outer diameter from the portion around which metal seal ring member 305 is disposed, thus forming a second annular shoulder 311. Below tubular retaining collar 301, there is disposed the compliant seal ring member or wear ring 307. Compliant seal ring member or wear ring 307 is preferably composed of a tough, high lubricity material, e.g., Teflon. Compliant seal ring member or wear ring 307 is held in place by tubular end or wear ring retaining collar 308, which is also threaded on its interior surface and also threadingly engaged on threads 313. The compliant seal ring member 307 has a larger outer diameter than the inside diameter of the counterbore 220 and accordingly has a slidable interference fit therewith. The tubular end collar 308 has a reduced inside diameter, radially inwardly extending flange 314 around its lower end and which is made up against lower end 312 of pack-off nipple 261.

Referring now to FIG. 3, annular metal seal ring member 305 of the present invention is shown to have an upper planar surface 316 and a lower planar surface 317, a radially inner surface 316 and a radially outer surface 320. Metal seal ring member 305 may be viewed as an annular ring of originally toroidal shape of circular cross-section which has been flattened on upper and lower sides 316, 317. This is apparent from the phantom line continuations of surfaces 318, 320 in FIG. 3. Of course, ring 305 may be, but need not be, originally made in toroid-shaped form, having a circular cross-section; it may be made in substantially the form shown in FIG. 3. Surfaces 316, 317 are substantially parallel to one another and substantially equidistant from the transverse central axis of ring member 305. Surfaces 316, 317 tend to reduce the hoop stiffness of ring member 305 and prevent the tendency of ring member 305 to roll when inserted into a bore.

Seal ring member 305 preferably is made of a material of sufficient plasticity to allow coining of radially inner and outer surfaces 318, 320 upon stab-in to effect a metal-to-metal seal, and yet the seal formed by this material should have sufficient strength to withstand the well fluid pressures found in service. In addition, care must be exercised to ensure that the material used for seal ring member 305 does not gall the receiving bore upon initial stab-in or subsequent removal from the bore and later, repeated stab-in and withdrawal procedures. It will be apparent to those skilled in the art that the metals to be used for the inner bore wall can also be selected in terms of their strength, hardness, and other properties in order to minimize galling. For example, metal seal ring member 305 may be made of AISI 4130 steel, which may also be through hardened, hard-faced, or "Tuftrided" (nitrided). Metal seal ring member 305 may also be made of stainless steel such as AISI 316. Receiving counterbore 220 may be made of AISI 4130 steel as well, and it may also be "Tuftrided" or nitrided, for example, to RMP 20030. Stainless steel, which may be nitrided, may also be used. It should be appreciated that these suggested materials are for illustration only, and are not to be interpreted in a limiting sense.

Radially outer surface 320 of metal ring member 305 has a greater outermost diameter than receiving counterbore 220 of tubing hanger 6 resulting in an interference fit such that when pack-off nipple 261 is stabbed into receiving counterbore 220, the radially outermost portions of surface 320 of metal ring member 305 "coin" onto the counterbore wall 220 of bore 200 forming a metal-to-metal seal against the wall. Shoulder 310 prevents upward movement of metal seal ring member 305 on pack-off nipple 261 during stab-in and assures localized metal-to-metal sealing. A portion of the stab-in load is transmitted to radially inner surface 318 of metal seal ring member 305 and effectively causes "coining" of surface 318 onto the outer surface of pack-off nipple 261. As pack-off nipple 261 is stabbed into counterbore 220, compliant seal ring member or wear ring 307 tends to clean, and may slightly lubricate, the walls of counterbore 220 during stab-in, and also tends to prevent damage to the wall of counterbore 220 of bore 200. Once the primary metal-to-metal seal is achieved upon complete stab-in, the metal-to-metal engagement of metal seal ring member 305 against the wall of counterbore 220 of receiving bore 200, and against the outer wall surface 270 of pack-off nipple 261, prevents fluid communication between the areas of receiving bore 200 above and below metal seal ring member 305. Elastomer seal ring member 304 serves as an environmental seal and may comprise a back-up seal for the primary metal-to-metal seal, and compliant seal ring member 307 serves as well as a low pressure environmental seal below the primary metal-to-metal seal.

The metal-to-metal seal created when metal seal ring member 305 is stabbed into receiving counterbore 220 is designed to withstand the high pressures, high temperatures, and harsh or eroding environments sometimes encountered in underwater oil or gas wells. The primary metal-to-metal seal formed by the present invention will accommodate stack-up tolerances of at least two inches and will also accommodate small axial movements of the sealed components after installation. Excessive stab-in loads, i.e., loads which could not be applied through the weight of the Christmas tree alone, are not necessary to achieve this primary metal-to-metal seal. When it is desired to remove pack-off nipple 261 from counterbore 220, metal seal ring member 305 slides relatively easily along the surface of counterbore 220. Compliant seal ring member 307 follows behind metal seal ring member 305 as pack-off nipple 261 is removed, and similarly to the stab-in operation tends to clean and possibly lubricate to some degree bore wall 220. Moreover, again similarly to the stab-in operation, compliant seal ring member 307 tends to prevent galling of the bore upon removal of pack-off nipple 261. Because damage to both outer wall surface 270 of pack-off nipple 261 and inner wall 220 is reduced, both components, and the seal ring member 305 as well, may be reused for repeated stab-in operations. If the same metal seal ring member 305 were used for such repeated stab-in operations, the stab-in load would be reduced, for example by nearly one-half, from the initial stab-in load, when greater plastic metal flow or coining occurs.

For purposes of illustration only, for a metal seal ring member having a diameter from radially inner surface 318 to radially outer surface 320 of between about 0.125 inches and about 0.127 inches, the distance between upper surface 316 and lower surface 317 will be between about 0.069 inches and about 0.071 inches. A metal sell ring having such dimensions could typically be used, for example, to seal a 5-⅛ inch, 10,000 p.s.i. working pressure bore. It will be apparent, however, to one skilled in the art that these dimensions can be varied, along with others such as the amount of interference with the walls to be sealed against, in order to achieve the desired sealing in any given case.

While a preferred embodiment of the invention has been shown and described, modifications thereof can be made by one skilled in the art without departing from the spirit of the invention. For example, the sealing assemblies may be used between wellheads and pipe hangers or between casing heads and tubing hangers or between a seabed tubing hanger and a downhole tubing hanger. The wear ring and elastomer environmental seal may be of any suitable type. It might be advantageous in some applications to employ a plurality of stacked metal seal ring members. Also, the relative positions of the nipples and bores may be reversed, e.g., the nipples could be on the tubing hanger and the bores on the Christmas tree. These are only some of the possible changes or variations.

I claim:

1. A seal assembly for providing a metal-to-metal seal between the outer wall of a tubular member and the inner wall of a receiving bore slidingly receiving the tubular member, comprising
a deformable metal seal ring member disposed around said tubular member,
said metal seal ring member having the general configuration of a toroid, the transverse section of the toroid having flattened upper and lower sides and arcuate inner and outer edges,
the planes of said upper and lower sides being substantially perpendicular to the central axis of said metal ring.

2. A seal assembly according to claim 1, wherein said upper and lower flattened sides are substantially equidistant from the central transverse axis of said metal seal ring member.

3. A seal assembly according to claim 1, and further including means for deforming the .radially inner and outer surfaces of said metal seal ring member and coining them into metal-to-metal sealing engagement with the outer wall of said tubular member and the inner wall of said receiving bore, respectively.

4. A seal assembly according to claim 1, wherein said metal seal ring member is made of stainless steel such as AISI 316.

5. A seal assembly according to claim 1, wherein said metal seal ring member is made of AISI 4130 steel.

6. A seal assembly according to claim 5, wherein said metal seal ring is through-hardened.

7. A seal assembly according to claim 5, wherein said metal seal ring is hard-faced.

8. A seal assembly according to claim 5, wherein said metal seal ring is nitrided.

9. A seal assembly according to claim 1, and further including a compliant seal ring member disposed on said tubular member below said metal seal ring member.

10. A seal assembly according to claim 9, wherein said compliant seal ring member is axially separated from said metal seal ring member by a collar disposed on said tubular member.

11. A seal assembly according to claim 10, wherein the outer surface of said tubular member has an annular shoulder thereon above said metal seal ring member, and said collar has an upwardly projecting portion in engagement with the lower surface of said metal seal ring member for supporting said metal seal ring member against said shoulder.

12. A seal assembly according to claim 9, wherein said compliant seal ring member is made of a material having high lubricity.

13. A seal assembly according to claim 12, wherein said compliant seal ring member is made of Teflon.

14. A seal assembly according to claim 9, and further including a second collar disposed on said tubular member below said compliant seal ring member for supporting said compliant seal ring member.

15. A seal assembly according to claim 9, and further including an elastomer seal ring disposed on said tubular member above and axially spaced from said metal seal ring member.

16. A sealing assembly for providing a primary, high pressure, metal-to-metal seal and a low pressure, compliant environmental seal in the annular space between the outer wall of a tubular member and the inner wall of a receiving bore slidingly receiving the tubular member, comprising:
- a deformable metal seal ring member disposed around said tubular member and adapted for metal-to-metal sealing engagement with the walls of said annular space, said metal seal ring member having the general configuration of a toroid with flattened upper and lower sides and arcuate inner and outer edges;
- the planes of said upper and lower sides being substantially perpendicular to the central axis of said metal rings; and
- a compliant seal ring member disposed on said tubular and adapted for sealing engagement with the walls of said annular space, said compliant seal ring member being disposed below and axially spaced from said metal seal ring member, said compliant seal ring member forming such environmental seal.

17. A sealing assembly according to claim 16, wherein said deformable metal seal ring member is made of alloy steel, and said compliant seal ring member is made of Teflon.

18. A sealing assembly according to claim 16, wherein said tubular member includes an annular shoulder above said metal seal ring member, and further including a collar disposed on said tubular member between said metal seal ring member and said compliant seal ring member, said collar having an upper portion in engagement with the metal seal ring member for supporting it against said shoulder.

19. A sealing assembly according to claim 18, and further including a second collar disposed on said tubular member below said compliant seal ring member for supporting said compliant seal ring member.

20. A sealing assembly according to claim 19, and further including an elastomer seal ring disposed on said tubular member above said metal seal ring member for providing a second environmental seal.

21. A sealing assembly according to claim 17, wherein said metal seal ring member is nitrided.

22. A sealing assembly according to claim 21, wherein the receiving bore is also made of nitrided alloy steel.

23. As a subcombination in a seal assembly for providing a metal-to-metal seal between the outer wall of a tubular member and the inner wall of a receiving bore slidingly receiving the tubular member, a seal comprising
- a metal ring having the general configuration of a toroid, the transverse section of the toroid having flattened upper and lower sides and arcuate inner and outer edges,
- the planes of said upper and lower sides being substantially perpendicular to the central axis of said metal ring.

* * * * *